Figure 1:
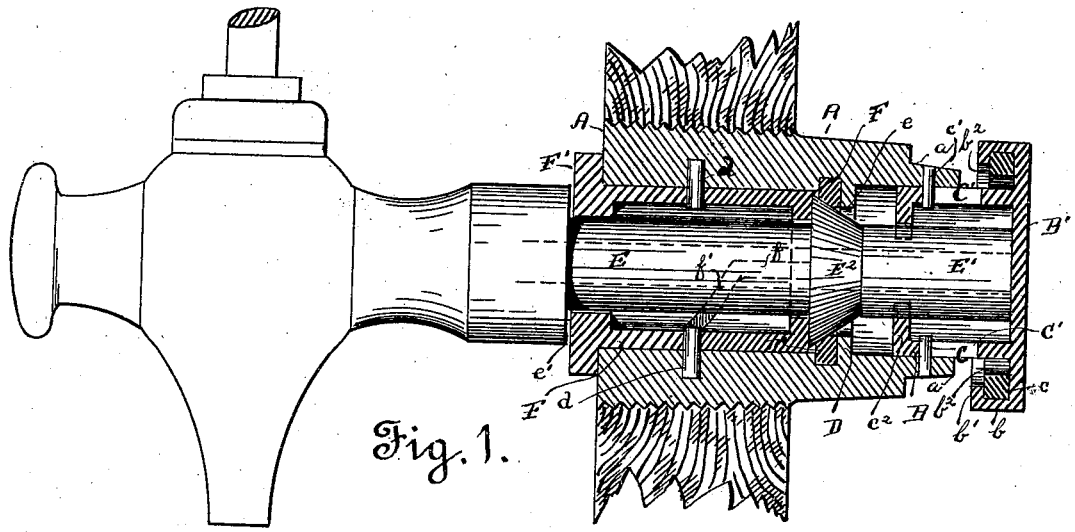

(No Model.)

G. H. MERRICK.
BUSHING AND FAUCET.

No. 502,572. Patented Aug. 1, 1893.

Witnesses.
J. C. Monteverde.
W. H. Cobb.

Inventor.
George H. Merrick
By N. A. Acker
Atty

UNITED STATES PATENT OFFICE.

GEORGE H. MERRICK, OF SAN FRANCISCO, CALIFORNIA.

BUSHING AND FAUCET.

SPECIFICATION forming part of Letters Patent No. 502,572, dated August 1, 1893.

Application filed November 28, 1892. Serial No. 453,346. (No model.)

*To all whom it may concern:*

Be it known that I, GEORGE H. MERRICK, a citizen of the United States, residing at San Francisco, in the county of San Francisco and State of California, have invented certain new and useful Improvements in Bushings and Faucets for Barrels; and I do hereby declare the following to be a full, clear, and exact description of said invention, such as will enable others skilled in the art to which it most nearly appertains to make, use, and practice the same.

This invention relates to an improved bushing and faucet for barrels, which consists in the arrangement of parts and details of construction as will be hereinafter more fully set forth in the drawings and described and pointed out in the specification.

The invention has for its object to provide a faucet whereby the valve shall be given a direct longitudinal movement with the inward or outward movement of the faucet, and one which, when the valve is opened, will be held within the bushing and its withdrawal prevented until the valve shall be closed in order to prevent the outflow of liquor therethrough, consequently preventing the valve being opened or tampered with unless the faucet be first inserted and moved the proper distance.

Referring to the drawings forming a part of this application, wherein similar letters of reference are used to indicate corresponding parts throughout the entire specification and several views—

Figure 2:
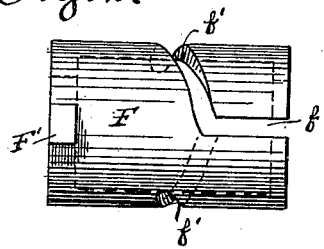
Figure 3:
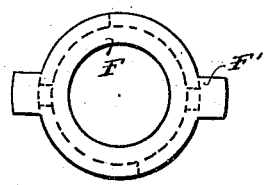
Figure 4:
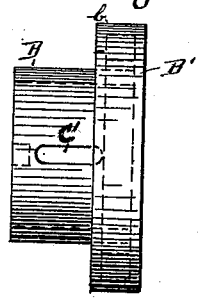
Figure 5:
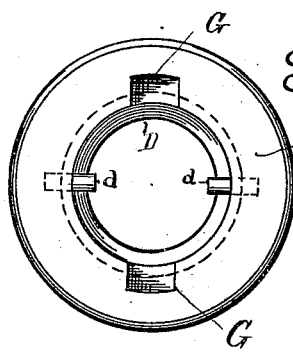
Figure 6:
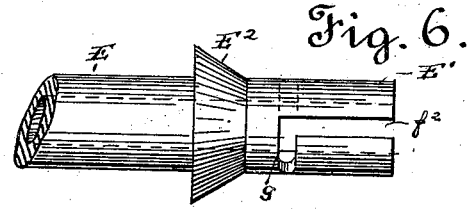
Figure 7:
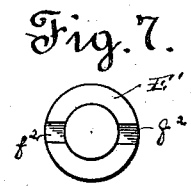

Figure 1 is a sectional view through the bushing, showing position of faucet when valve is opened; Fig. 2, a detail view of the faucet sleeve or shell. Fig. 3 is an end view of the device shown in Fig. 2; Fig. 4, a side detail view of the valve; Fig. 5, end view of the bushing; Fig. 6, broken detail view of the faucet; and Fig. 7, end view of Fig. 6.

The letter A, indicates the bushing or thimble which is secured within the barrel opening, as shown. The inner end of this bushing is reduced and tapered, as shown at $a$, and within the inner portion of the bushing works the valve stem or wall B. The valve B', is provided with an annular rim $b$, and an inwardly turned flange $b'$, which provides an annular groove $b^2$, within which groove is secured a packing ring $c$, which forms a seat for end $a$, of the bushing, when the valve is closed, in order to provide a tight joint. The valve is secured within the bushing by means of the pins or studs C, which project inwardly through elongated slots C', formed in wall or valve stem B. This stem is also provided with two inwardly projecting lugs $c^2$, which engage the inner end of the faucet, as hereinafter more fully described. The bushing A, is cast with an inwardly projecting annular shoulder D, upon which a packing ring D', is secured, and is further provided with two inwardly projecting lugs or pins $d$.

The faucet is represented by the letter E, the inner end E', of which is formed into a faucet or valve key. Upon this faucet is secured an inclined collar $E^2$, which, when the faucet is inserted within the bushing, engages or contacts with the packing ring located upon the annular shoulder of the bushing, and as the faucet moves inward, in order to open the valve, works through passage-way $e$, formed by said shoulder. Upon the faucet, between shoulder $e'$ and collar $E^2$, is located sleeve or shell F. This shell is provided with two elongated slots $f$, only one being shown, which terminate in inclined or spiral slots $f'$. The upper end of the sleeve or shell is formed with an outwardly projecting flange or lugs F', which are adapted to bear upon the face of the bushing when the faucet valve is opened, as shown in Fig. 1, in order to prevent the further inward movement of the sleeve. The lower end of the faucet, or the key portion E', is cast with two slots $f^2$, each of which terminates in right angular slots $g$, see Fig. 6.

The operation of my device for opening and closing the valve is as follows: The faucet is inserted within the bushing until collar $E^2$, contacts with packing ring located upon shoulder D, the lugs or pins $d$, and $c^2$, of bushing and valve fitting within elongated slots $f$ and $f^2$, of sleeve F and faucet end or key E'. This direct insertion of the faucet brings the said pins or lugs opposite the inclined and right angular slots $f'$ and $g$, of sleeve and key. When in this position, the faucet is carried inward, in order to open the valve, by rotation of the sleeve F, which is rotated by hand or a suitable tool. As the sleeve is rotated, the same is forced inward until the outer flange or lugs impinge against the outer face of the bushing when further inward movement of the sleeve will be prevented. Inasmuch as the sleeve is located upon the faucet between shoulder $e'$ and collar $E^2$, it is obvious that as the sleeve is moved inward the faucet is carried thereby, the sleeve being forced to move longitudinally, when rotated, by the pins or lugs $d$ fitting within the spiral slots in the sleeve. As the faucet or key is carried inward, the end thereof comes into contact with the same and moves it. Thus the valve is not rotated but simply moved longitudinally by the pressure of the faucet thereon as the same is forced inward by rotation of the sleeve. After the valve is opened, the faucet is turned so as to cause pins $c^2$, to be held within right-angular slot $g$, in order to prevent the withdrawal of the faucet without closing the valve. The valve is closed by simply imparting reverse rotation to the sleeve which forced same outward or upward, and inasmuch as same bears against shoulder $e'$, of the faucet, it is obvious that the same is likewise carried upward. After the faucet has moved outward the full distance of the inclined sleeve slots, the same is turned so as to take valve pins or studs C, from within right-angular slot of the key, and the faucet is then removed from within the bushing. When the valve is closed, the reduced end $a$, of the bushing fits snugly within the packing ring secured within the annular groove $b^2$. The bushing is provided with recesses G at its front end adapted to be engaged by a suitable wrench to turn the bushing home within the barrel opening.

Having thus described my invention, what I claim as new, and desire to secure protection in by Letters Patent, is—

1. The combination with the bushing, of the valve, the faucet for opening and closing the valve, the inwardly projecting pins secured within the bushing, the rotatable sleeve secured on the faucet, and the elongated slots formed within the sleeve, said slots terminating in inclined slots, which slots are engaged by the bushing pins, said sleeve when rotated, serving to force the faucet in or out so as to open or close the valve.

2. In a lock faucet, the combination with the bushing, of the valve, the slots formed in said valve, the pins for holding the valve within the bushing, the faucet provided with an end key, the lugs projecting inwardly from the valve, and the elongated slots formed in the key, said slots terminating in right-angular slots, said slots adapted to engage the valve lugs in order to open or close the valve.

In testimony whereof I affix my signature in presence of two witnesses.

GEORGE H. MERRICK.

Witnesses:
N. A. ACKER,
GEO. H. HOLT.